(12) United States Patent
Skijus et al.

(10) Patent No.: US 8,684,374 B2
(45) Date of Patent: Apr. 1, 2014

(54) CART ACCESSORY HANDLE FOR LIFTING AND DUMPING

(75) Inventors: John Skijus, Franklin Square, NY (US); Thomas Berinato, Lynbrook, NY (US)

(73) Assignee: Stable Innovations Ltd, Franklin Square, NY (US)

( * ) Notice: Subject to any disclaimer, the term of this patent is extended or adjusted under 35 U.S.C. 154(b) by 92 days.

(21) Appl. No.: 13/317,335

(22) Filed: Oct. 14, 2011

(65) Prior Publication Data
US 2012/0181764 A1   Jul. 19, 2012

(51) Int. Cl.
*B62B 1/18*   (2006.01)
*B62B 1/20*   (2006.01)

(52) U.S. Cl.
CPC ... *B62B 1/20* (2013.01); *B62B 1/18* (2013.01); *B62B 1/204* (2013.01)
USPC .................................................. 280/47.31

(58) Field of Classification Search
CPC .............. B62B 5/06; B62B 1/20; B62B 1/18; B62B 1/204
USPC .............. 280/47.31; 16/110.1, 406, 408, 409, 16/422, 426
See application file for complete search history.

(56) References Cited

U.S. PATENT DOCUMENTS

| | | | | |
|---|---|---|---|---|
| 591,547 | A * | 10/1897 | O'Neill | 16/409 |
| 1,325,557 | A | 12/1919 | Cummins | |
| 1,513,469 | A | 10/1924 | Robinson | |
| 1,544,769 | A * | 7/1925 | Nalder | 298/3 |
| 1,553,297 | A * | 9/1925 | Place | 16/406 |
| 1,808,890 | A * | 6/1931 | Grant | 16/406 |
| 1,815,244 | A | 7/1931 | Dodge | |
| 2,350,062 | A | 5/1944 | Mosier | |
| 2,422,331 | A * | 6/1947 | Bates | 280/42 |
| 2,494,144 | A | 1/1950 | Restall | |
| 2,553,334 | A | 5/1951 | Schmidt | |
| 2,598,682 | A * | 6/1952 | Giovannoni | 280/14 |
| 2,624,431 | A * | 1/1953 | Caro | 16/408 |
| 2,872,202 | A | 2/1959 | Tripoli | |
| 2,902,286 | A | 9/1959 | Wood, Jr. | |
| 2,938,748 | A | 5/1960 | Johnson | |
| 2,979,338 | A * | 4/1961 | Dwyer | 280/47.3 |
| 3,045,847 | A * | 7/1962 | Fisher | 414/444 |

(Continued)

FOREIGN PATENT DOCUMENTS

| | | | | |
|---|---|---|---|---|
| DE | 3836881 C1 * | 8/1989 | | B62B 1/20 |
| GB | 2135249 A * | 8/1984 | | B62B 1/20 |
| GB | 2241204 A * | 8/1991 | | B62B 1/20 |
| WO | WO 9429157 A1 * | 12/1994 | | B62B 1/20 |

*Primary Examiner* — Hau Phan
*Assistant Examiner* — Jacob Meyer
(74) *Attorney, Agent, or Firm* — Alfred M. Walker

(57) ABSTRACT

A dual handled liftable wheelbarrow with a bin and a wheel assembly has a fixed handle mounted on a rear wall thereof. A bracket is mounted on an outside of the front wall for mounting an adjustable handle with an elongated resilient grip having end arms swiveling about and mounted on said forwardly extending members of the bracket, so that the handle is rotatable between a parked position flush downwardly against the outside of said front wall, and an upwardly extending deployed position with said resilient grip above the open top of said bin. The fixed and adjustable handles are mounted at substantially equal heights on the rear and front walls, respectively, of the bin to allow two users working together to unload debris from the bin over a side wall of the bin into a collection box.

4 Claims, 3 Drawing Sheets

(56) References Cited

U.S. PATENT DOCUMENTS

| | | | |
|---|---|---|---|
| 3,161,434 A * | 12/1964 | Jerpbak | 296/36 |
| 3,188,109 A | 6/1965 | Broadrick | |
| 3,236,537 A | 2/1966 | Eckman | |
| 3,463,504 A | 8/1969 | Petry et al. | |
| 3,679,227 A | 7/1972 | Rock | |
| 3,751,058 A | 8/1973 | Larsen | |
| 3,820,807 A * | 6/1974 | Curran | 280/47.3 |
| 3,870,367 A * | 3/1975 | O'Brien | 298/1 B |
| 3,894,753 A | 7/1975 | Ickes | |
| 3,913,762 A | 10/1975 | Alexander | |
| 3,936,070 A | 2/1976 | Owings | |
| 3,977,477 A * | 8/1976 | Wise | 172/246 |
| 4,055,354 A * | 10/1977 | Sharpe | 280/47.31 |
| 4,190,260 A * | 2/1980 | Pearce | 280/47.31 |
| 4,194,654 A | 3/1980 | Badger | |
| 4,199,161 A | 4/1980 | Nieminen et al. | |
| 4,223,907 A | 9/1980 | Kelly | |
| 4,253,677 A | 3/1981 | Wissler | |
| 4,261,596 A | 4/1981 | Douglas | |
| 4,266,791 A | 5/1981 | Myers | |
| 4,274,649 A | 6/1981 | Vanderhorst et al. | |
| 4,316,615 A | 2/1982 | Willette | |
| 4,375,113 A | 3/1983 | Ewert | |
| 4,645,225 A | 2/1987 | Eubanks | |
| 4,663,802 A * | 5/1987 | Kunzler | 16/408 |
| 4,758,010 A * | 7/1988 | Christie | 280/47.31 |
| 4,783,090 A | 11/1988 | Moulton | |
| 4,789,171 A | 12/1988 | Porter | |
| 4,789,180 A | 12/1988 | Bell | |
| 4,825,505 A | 5/1989 | Witte | |
| 4,846,427 A | 7/1989 | Jones | |
| 4,873,841 A | 10/1989 | Bradshaw et al. | |
| 4,889,360 A | 12/1989 | Havlovitz | |
| 4,932,677 A * | 6/1990 | Shustack | 280/28.5 |
| 4,957,306 A | 9/1990 | Greenberg | |
| 4,958,846 A | 9/1990 | Greenberg | |
| 5,040,807 A * | 8/1991 | Snover | 280/30 |
| D321,966 S * | 11/1991 | Fuller | D34/27 |
| 5,067,737 A * | 11/1991 | Broeske | 280/47.31 |
| 5,106,113 A * | 4/1992 | Piacentini | 280/47.21 |
| 5,116,289 A | 5/1992 | Pond et al. | |
| 5,149,116 A | 9/1992 | Donze et al. | |
| 5,163,694 A | 11/1992 | Reichek | |
| 5,263,727 A | 11/1993 | Libit et al. | |
| 5,277,449 A | 1/1994 | Schmidt | |
| 5,290,055 A | 3/1994 | Treat, Jr. | |
| 5,313,817 A * | 5/1994 | Meinders | 62/457.1 |
| 5,318,315 A | 6/1994 | White et al. | |
| 5,330,212 A | 7/1994 | Gardner | |
| D351,700 S | 10/1994 | Uzelman | |
| 5,374,095 A | 12/1994 | Ramseth | |
| D362,100 S | 9/1995 | McMurdo | |
| 5,461,755 A | 10/1995 | Hardigg et al. | |
| 5,620,193 A * | 4/1997 | Dschaak | 280/47.31 |
| 5,687,979 A * | 11/1997 | Plevka | 280/47.19 |
| 5,692,761 A | 12/1997 | Havlovitz | |
| 5,803,472 A | 9/1998 | Lien | |
| 5,806,866 A | 9/1998 | Fleischer | |
| 5,820,141 A | 10/1998 | Wilkerson et al. | |
| 5,839,772 A * | 11/1998 | Toole | 296/32 |
| 5,884,924 A | 3/1999 | Fairchild et al. | |
| 5,909,758 A * | 6/1999 | Kitamura | 16/406 |
| 5,957,352 A | 9/1999 | Gares | |
| 6,098,492 A | 8/2000 | Juchniewicz et al. | |
| 6,139,029 A | 10/2000 | Shaw | |
| 6,193,265 B1 * | 2/2001 | Yemini | 280/653 |
| 6,213,482 B1 | 4/2001 | Yemini | 280/47.26 |
| 6,213,532 B1 | 4/2001 | Dunyon | 296/32 |
| 6,397,435 B1 * | 6/2002 | Gosselet | 16/438 |
| 6,499,193 B1 | 12/2002 | Robert | |
| 6,547,309 B1 * | 4/2003 | Franklin et al. | 296/98 |
| 6,550,104 B2 * | 4/2003 | Cacciacarne | 16/426 |
| 6,554,301 B2 | 4/2003 | Scott et al. | |
| 6,561,529 B2 | 5/2003 | Darling, III | |
| 6,643,897 B2 * | 11/2003 | Chang | 16/248 |
| 6,880,852 B2 * | 4/2005 | Lim | 280/653 |
| 6,964,421 B2 | 11/2005 | Friel | |
| 7,571,517 B2 | 8/2009 | Smith et al. | |
| 7,641,204 B2 | 1/2010 | Rye et al. | |
| 7,775,530 B2 * | 8/2010 | Darling, III | 280/47.18 |
| 7,815,215 B1 * | 10/2010 | Lowe | 280/639 |
| 7,850,176 B2 | 12/2010 | Hill | |
| 7,866,686 B2 | 1/2011 | Conaway et al. | |
| 7,900,939 B2 * | 3/2011 | Robinson | 280/47.31 |
| 8,366,125 B2 * | 2/2013 | Loomans | 280/47.17 |
| 2001/0047569 A1 * | 12/2001 | Cacciacarne | 16/426 |
| 2003/0011154 A1 * | 1/2003 | Scott et al. | 280/47.31 |
| 2004/0041361 A1 * | 3/2004 | Lim | 280/47.31 |
| 2004/0084864 A1 * | 5/2004 | Casey et al. | 280/47.31 |
| 2005/0062245 A1 | 3/2005 | Tomchak et al. | |
| 2006/0103088 A1 * | 5/2006 | Robinson | 280/47.31 |
| 2007/0052187 A1 * | 3/2007 | Browder | 280/47.31 |
| 2007/0096414 A1 * | 5/2007 | Beaudoin | 280/47.31 |
| 2007/0114765 A1 | 5/2007 | Leger et al. | |
| 2007/0296166 A1 * | 12/2007 | Robinson | 280/47.31 |
| 2008/0079228 A1 * | 4/2008 | Rye et al. | 280/47.31 |
| 2008/0179847 A1 | 7/2008 | DeFrancia | 280/47.26 |
| 2010/0201091 A1 * | 8/2010 | Easterling | 280/47.31 |
| 2010/0270764 A1 * | 10/2010 | Odle et al. | 280/47.19 |
| 2011/0260420 A1 * | 10/2011 | Volin | 280/47.31 |
| 2011/0001958 A1 | 12/2011 | Skijus | |
| 2012/0049473 A1 * | 3/2012 | Robinson | 280/47.31 |
| 2012/0126502 A1 * | 5/2012 | Robinson | 280/47.31 |

* cited by examiner

US 8,684,374 B2

CART ACCESSORY HANDLE FOR LIFTING AND DUMPING

FIELD OF THE INVENTION

The present invention relates to accessory handles for lifting wheelbarrows and carts.

BACKGROUND OF THE INVENTION

Carts and wheelbarrows are well represented in the prior art. Some carts are general purpose, while others are designed for a specific use. Wheelbarrows are used commonly both on the farm as well as the construction site. A stable for the use of horses requires frequent cleaning and moving of used straw from the stalls to a dumping area which can be a dumpster with high sides. Carts with two wheels and a deep bin are often used. Wheelbarrows with one wheel are also used at times for the same purpose to move the used straw. Since the carts and wheelbarrows for stall cleaning service must be emptied in an efficient manner, an auxiliary handle mounted to the bin portion opposite the primary handle or handles is an effective aid in this task.

U.S. Pat. No. 2,350,062 of Mosier shows a four wheel cart with small wheels, a low bin portion, and a front pivoted steering arrangement for the two front wheels. Besides a rod-mounted front pulling handle, a second pushing handle is mounted to the bin at the rear.

U.S. Pat. No. 4,223,907 of Kelly reveals a separable mortar cart with two attached separate deep bins and a total of six wheels. The intent is to transport a large amount of material substantially filling both bins from a supply point to a distribution point in a unitary configuration by a single worker pushing on either of the handles attached to opposite ends of the composite cart rolling on four large wheels. Upon reaching a distributing point, the cart is separated and each half is handled by one worker using two large wheels and a third smaller wheel that is now permitted to touch the ground. In this manner, the lower weight of one bin would be easily supported by scaffolding. These are heavy duty carts which are not designed for lifting in either separated or unitary configurations by the single or two handles respectively.

U.S. Pat. No. 6,139,029 of Shaw relates to a portable 2-wheeled utility cart with high handles placed at two opposite sides. Besides these high handles extending from the bin ends, a carrying handle or grip is centrally attached to the upper margin of each of the bin ends to lift the cart or to maneuver it into a motor vehicle. With a lower bin and high handles, this cart is unwieldy to tip sideways. The short centrally mounted grips limit the dumping torque that can be applied to the cart.

SUMMARY OF THE INVENTION

A stable cart or wheelbarrow can be easily filled with used straw and transported to a raised collection receptacle, such as a dumpster, by a single groom. However, if the straw must be transferred to the dumpster in an efficient manner, the most time-saving and effective method would be to lift the cart or wheelbarrow over the edge of the dumpster to dump its entire contents in one motion. The alternative is to use a fork to transfer portions of the cart contents over the edge of the dumpster thereby almost surely spilling some in the vicinity. Since a stable cart or wheelbarrow is heavy and has a handle or handles on only one end of the bin for pushing, it is difficult for a second groom to help lift and dump the contents. The accessory handle of this invention attached to the bin opposite to the pushing handle facilitates the latter two-person operation in an ergonomic fashion. By equalizing the height of the front and rear handles, this adds to user safety, because it enables the two lifters to lift the wheelbarrow under equal lifting forces, thereby preventing one or both of the lifters from slipping and falling during the lifting process.

In the first embodiment the front handle assembly includes a centrally mounted wide handle with a cushioned grip that can swivel to a working position by simply pulling the cushioned portion out of a parked position against the cart bin. In a second embodiment, the front handle swivels on a bracket to a desired fixed working position and is then locked in place using a ratchet member and tightening knob. In a third embodiment, two separated fixed short front handles are attached to the cart or wheelbarrow bin instead of a centrally mounted wide handle.

The front auxiliary handle has an equal height to that height of the rear conventional pushing handle when the auxiliary handle is at a deployed lifting height; with the equal height being at a level close to the top of the wheelbarrow bin that is most useful for lifting and dumping. This equal height of the front and rear handles enables two respective lifting users to have these respective front and rear handles at equal chest height when tipping the contents of the wheelbarrow cart into a dumpster or compost bin.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
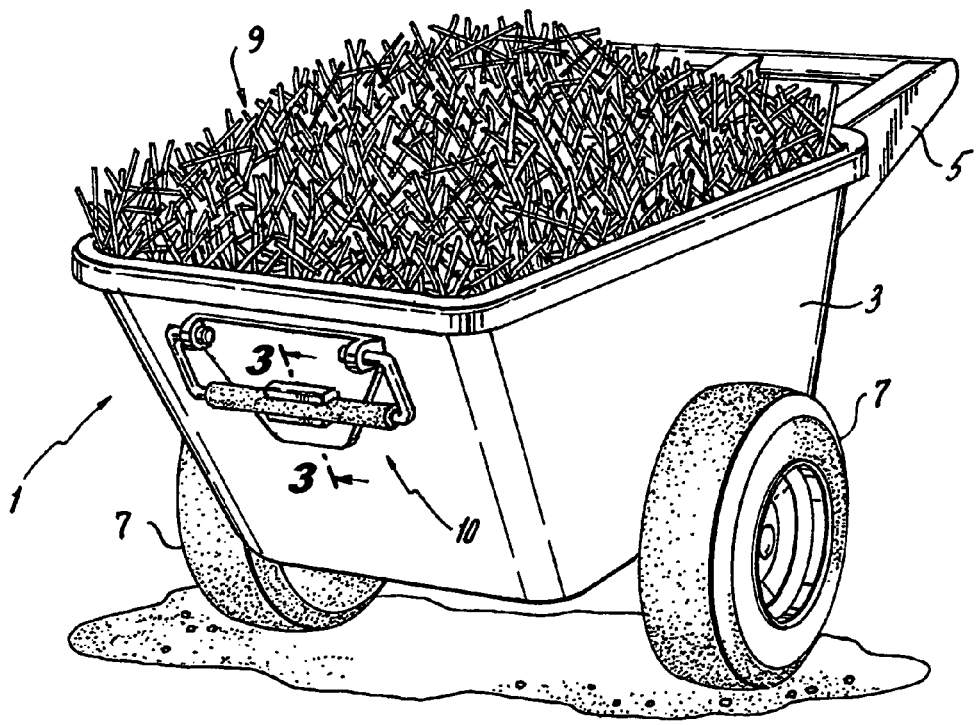
FIG. 1 is a perspective view of a two wheel stable cart with a swiveling front accessory handle for lifting and dumping.

Although either a single wheel wheelbarrow or a two wheel cart can be fitted with a front accessory handle, FIG. 1 depicts a two wheel cart 1 with molded handle 5, bin 3 and wheels 7. It is carrying a load of straw 9. An accessory front handle assembly 10 is attached to the upper front surface of bin 3.

Figure 2:
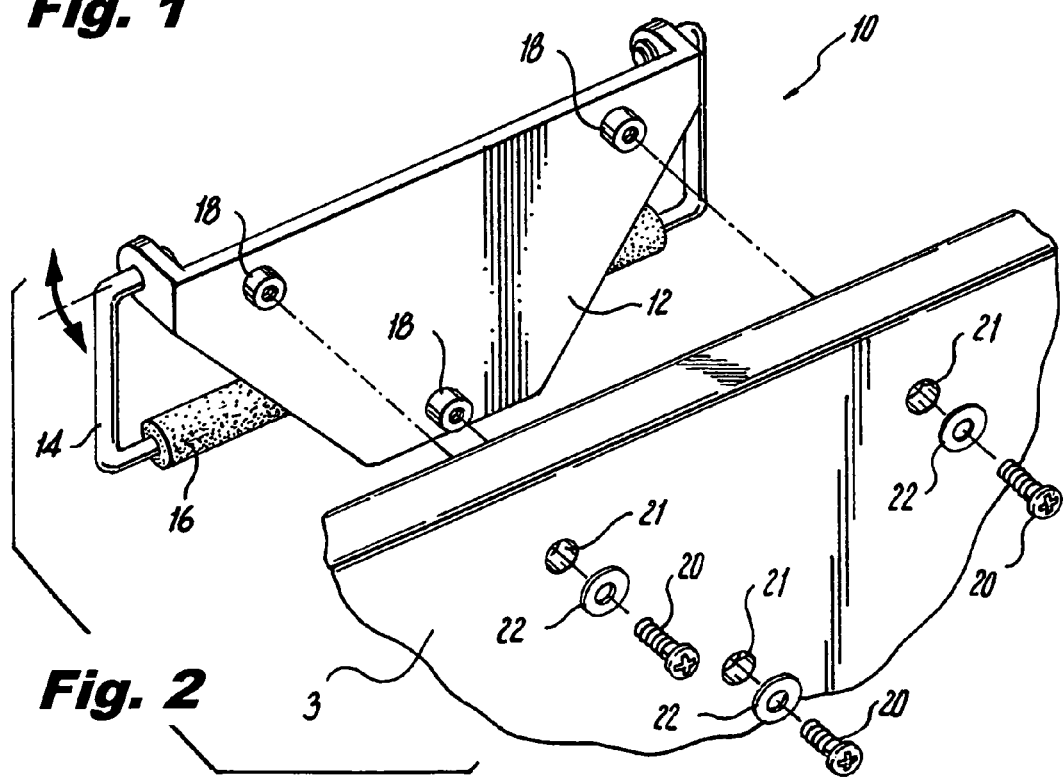
FIG. 2 is an enlarged perspective detail of the handle assembly shown in FIG. 1.

FIG. 2 shows the parts of handle assembly 10 and the method of attachment.

Figure 3:
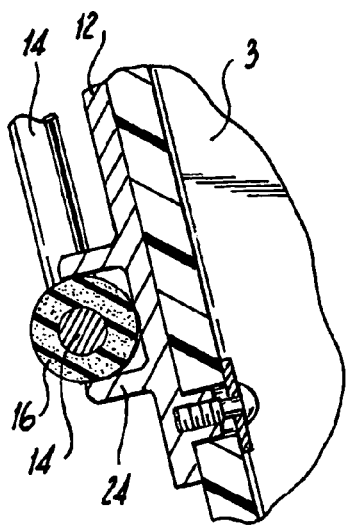
FIG. 3 sectional elevation detail of the handle assembly of FIG. 2.

The crossection view of FIG. 3 further describes handle 10 assembly. Attachment plate 12 holds the ends of handle 14 and has bosses 18 which fit inside holes 21 in bin 3 material.

The attachment is completed with screws 20 and washers 22; screws 20 engage threaded blind holes in bosses 18. Handle 14 with resilient grip 16 is held against bin 3 end when not in use by friction with the inside surfaces of channel 24 which slightly deform grip material 16.

Figure 5:
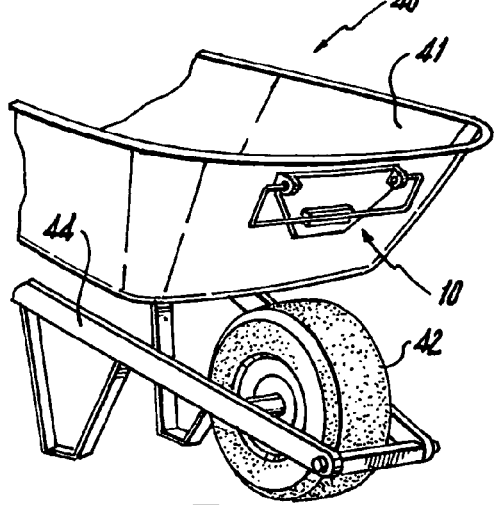
FIG. 5 is a perspective view of the handle assembly of FIG. 2 installed on the front of a curved tub wheelbarrow.
Figure 5A:
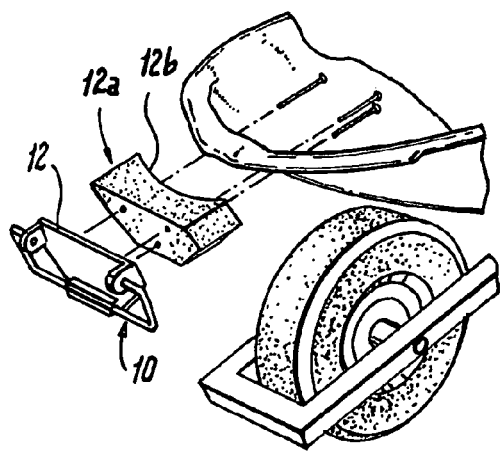
FIG. 5*a* is a detailed close-up view of an adapter for installing the handle assembly of FIG. 2 on the front of a curved tub wheelbarrow.

FIG. 5 shows handle assembly 10 attached to the end of wheelbarrow 40 with curved tub 41, frame 44 and single wheel 42. FIG. 5a shows an alternate embodiment for a wheelbarrow with a curved bull nosed front end, where flat plate bracket 12 with handle 10 held in place with a flexible adapter 12a having a curved surface 12b adapted to conform to the curved bull nosed front end of the wheelbarrow.

Figure 4:
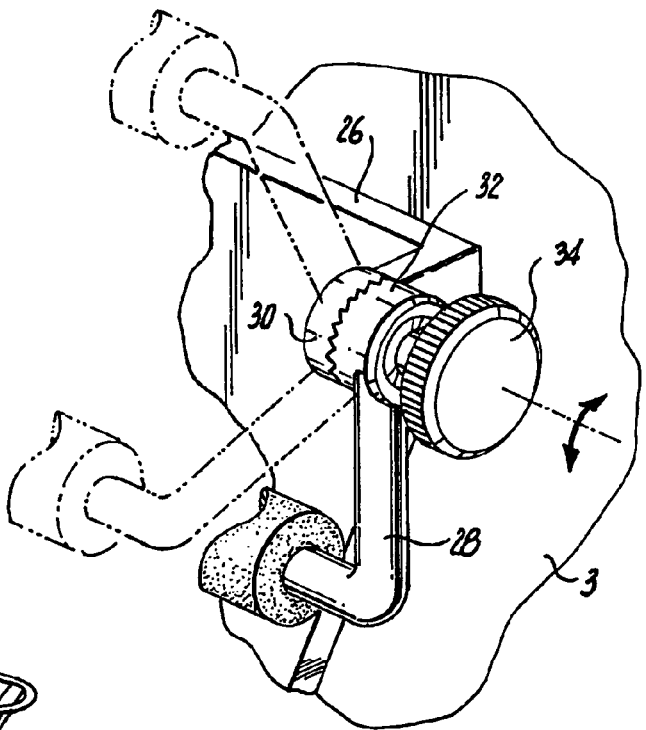
FIG. 4 is a perspective view of a second embodiment handle with a tilt ratchet to allow the handle to be selectively angled.

FIG. 4 shows the details of a second embodiment accessory front handle assembly. Frame 26 is rigidly attached to fixed ratchet member 30 while handle 28 is rigidly attached (as by welding, for example) to rotatable ratchet 32. Screw knob 34 forces the ratchet faces together to lock the position of handle 28 in any desired position as indicated by the two phantom views. This is ergonomically superior to handle 10 assembly as it affords rigidity to a handle 28 during the lifting and dumping procedure. The ratchet assembly 32 includes a fixed ratchet member 30 mounted on one of said forwardly extending members 28 of the bracket, a mating, rotatable ratchet member 32 attached to the corresponding end arm of the adjustable handle, and a screw knob 34 to separate the fixed and rotatable ratchet members 30, 32 temporarily to allow the resilient grip 16 to be positioned at any one of multiple positions between the parked position and the fully deployed position, whereby the elongated resilient grip 16 is fixed in whatever position it is held by the matching and fully mated ratchet members 30, 32.

Figure 6:
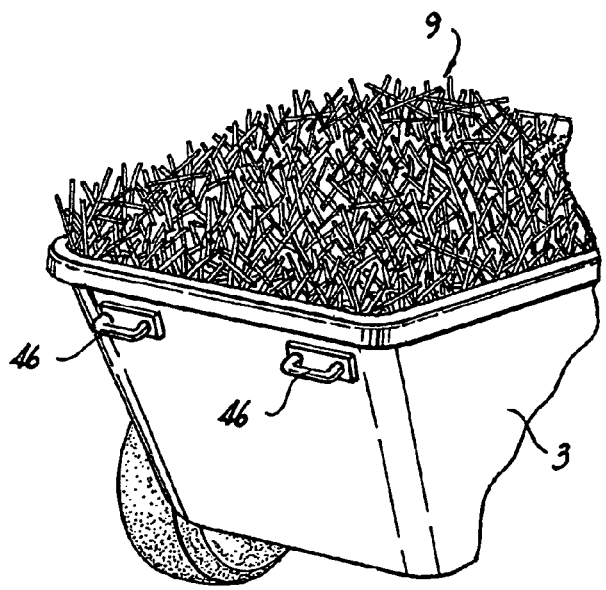
FIG. 6 is a perspective view showing a cart fitted with two separate front accessory handles comprising a third embodiment.

FIG. 6 shows the third embodiment of accessory handle in which two separate short handles 46 substitute for a single centrally located handle. The separation of handles 46 afford good torque transfer to bin 3 for dumping.

Figure 7:
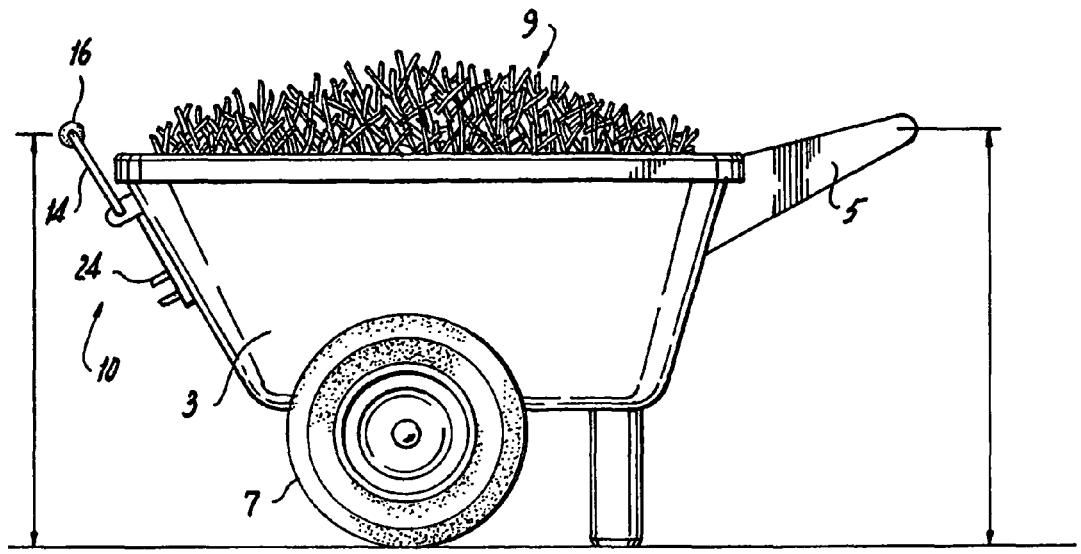
FIG. 7 is a side elevation of a cart showing the relative height of a front accessory handle relative to the rear pushing handle.

FIG. 7 illustrates the equal height of the rear pushing handle and the grip 16 of handle assembly 10 when handle is at deployed height. It is this equal height at the level close to the top of bin 3 that is most useful for lifting and dumping. FIG. 7 also illustrates the equal height of the rear pushing handle 5 and the grip 16 of handle assembly 10 when the handle is at its deployed height. It is this equal height at the level close to the top of bin 3 that is most useful for lifting and dumping. This height also enables the users, such as two grooms at a racetrack, to have the respective handles 5 and 10 at equal chest height when the biceps are strongest at an ergonomic right angle, when tipping the contents 9 of the cart 1 into a dumpster 53. If the handles 5 and 10 were much higher than the top of the bin 3 of the cart, then the users would have to uncomfortably extend the users' arms over the users' respective head areas, so that the top of the bin 3 was at the height level of the top of the dumpster 53.

Figure 8:
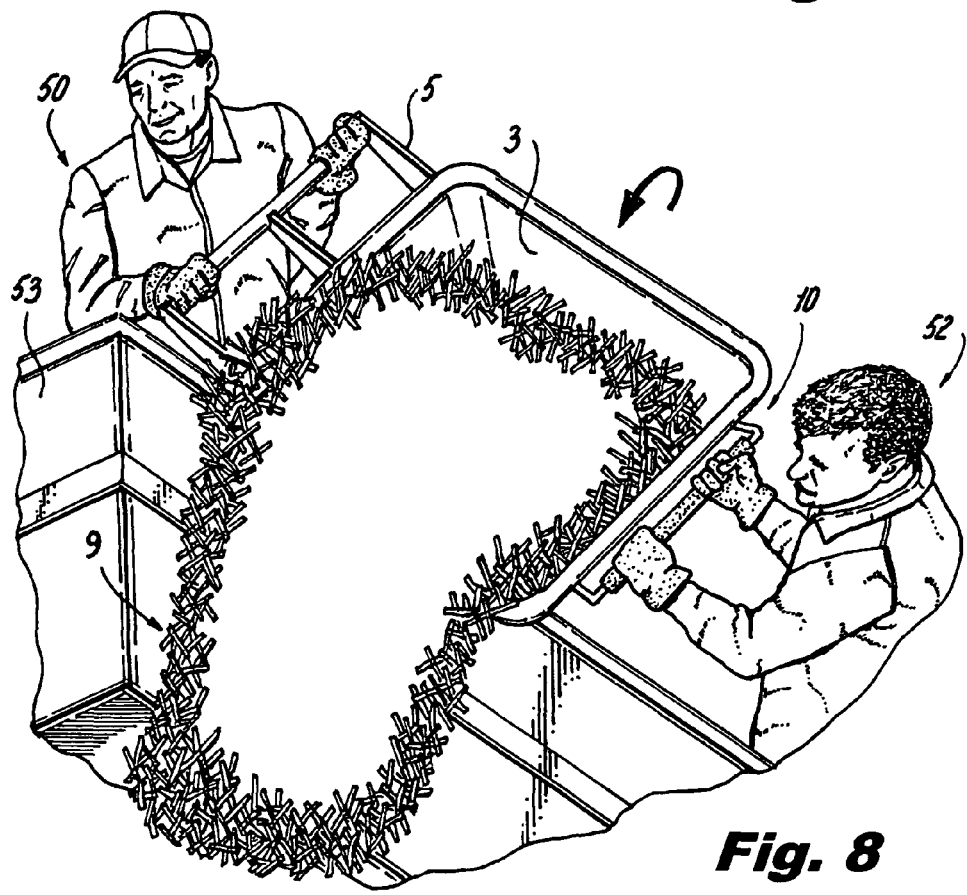
FIG. 8 is a perspective view of two grooms dumping a cart full of used straw into a dumpster.

FIG. 8 illustrates the process of actually lifting and dumping the contents of a stable cart into a raised collection receptacle, such as dumpster 53. Groom 50 is grasping rear handle 5 of the cart while groom 52 is using front handle assembly 10. In an equivalent procedure using a stable wheelbarrow (instead of a two wheel cart) with accessory handle mounted on the front of the tub, groom 50 would be grasping the ends of two separate pushing handles as commonly used on wheelbarrows. Instead of dumpster 53, the cart can be used to transport yard debris into the raised walled confines of a compost container.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. An auxiliary handle for wheelbarrow having a bin, a rear pushing handle and at least one wheel, said auxiliary handle comprising at least one auxiliary fixed front handle extending cantilevered outward from a flat surface panel mountable on an outside front end of the wheelbarrow bin at an opposite end of the wheelbarrow bin from the rear handle assembly; said auxiliary fixed front handle providing at least one second lifting handle at a front end of said wheelbarrow opposite to the conventional pushing handle at a rear of said wheelbarrow;

said at least one fixed front auxiliary handle having an equal height to that height of said rear conventional pushing handle assembly when said at least one fixed front auxiliary handle is at a deployed lifting height; said equal height of said at least one fixed front auxiliary handle and said rear conventional pushing handle assembly being both at a level close to the top of said wheelbarrow bin that is most useful for lifting and dumping;

said height of said front and said rear handles enabling two respective lifting users to have said respective front and rear handles at equal chest height when tipping the contents of said wheelbarrow cart into a raised collection receptacle.

2. The at least one auxiliary front fixed handle for a wheelbarrow of claim 1 wherein said raised collection receptacle is a dumpster.

3. The at least one auxiliary front fixed handle for a wheelbarrow of claim 1 wherein said raised collection receptacle is a compost container.

4. The at least one auxiliary front fixed handle for a wheelbarrow of claim 1 in which said at least one auxiliary front fixed handle comprises multiple auxiliary front fixed handles and further in which said multiple auxiliary front fixed handles are each mounted to respective flat surface panels on said front wall of said bin.

* * * * *